United States Patent [19]

Sturm

[11] 4,349,397

[45] Sep. 14, 1982

[54] METHOD AND DEVICE FOR CONNECTING PIPE COMPONENTS MADE OF WELDABLE PLASTIC

[76] Inventor: Werner Sturm, Allerheiligenstr., 624, Hägendorf, Switzerland

[21] Appl. No.: 177,746

[22] PCT Filed: Apr. 23, 1979

[86] PCT No.: PCT/CH79/00055

§ 371 Date: Dec. 24, 1978

§ 102(e) Date: Nov. 28, 1979

[87] PCT Pub. No.: WO79/00973

PCT Pub. Date: Nov. 29, 1979

[30] Foreign Application Priority Data

Apr. 24, 1978 [CH] Switzerland .................. 4406788/78

[51] Int. Cl.³ ............................................. B29C 27/02
[52] U.S. Cl. ................................... 156/64; 156/304.2; 156/304.6; 156/359; 156/366; 156/378; 156/379.7; 156/274.2; 219/61.5; 219/66; 219/67
[58] Field of Search .................... 156/304.2, 304.6, 64, 156/275, 359, 366, 378, 380, 304.1, 379.7

[56] References Cited

U.S. PATENT DOCUMENTS

| | | | |
|---|---|---|---|
| 2,393,429 | 1/1946 | Swinehart | 156/275 |
| 2,423,922 | 7/1947 | Arndt, Jr. | 156/275 |
| 3,506,519 | 4/1970 | Blumenkranz | 156/275 |
| 3,788,928 | 1/1974 | Wise | 156/275 |
| 3,822,164 | 7/1974 | Guido et al. | 156/359 |
| 3,925,139 | 12/1975 | Simmons | 156/378 |
| 3,996,402 | 12/1976 | Sindt | 156/275 |

FOREIGN PATENT DOCUMENTS 80153 8/1955 Netherlands .
605082 9/1978 Switzerland .

Primary Examiner—Michael G. Wityshyn
Attorney, Agent, or Firm—Roylance, Abrams, Berdo & Farley

[57] ABSTRACT

Pipe components, i.e., pipes, adapting members and fittings made of weldable plastic, are interconnected by electrically weldable joints. The welding process is made possible by a welding sleeve 3 being connected to the output 4 of the device. A switch-on monitor 11 permits the switching on of a switch stage 7 of the welding current circuit. The thermal energy is determined by square-law simulation of the welding or mains voltage in a pulse generator 9, which produces a pulse frequency which is dependent on this value and whose pulses are summed in a counter 10. Once a count value that corresponds to the thermal energy has been reached, the switch stage 7 is switched off. If the count value is not reached a function monitor 5 gives a warning signal.

11 Claims, 1 Drawing Figure

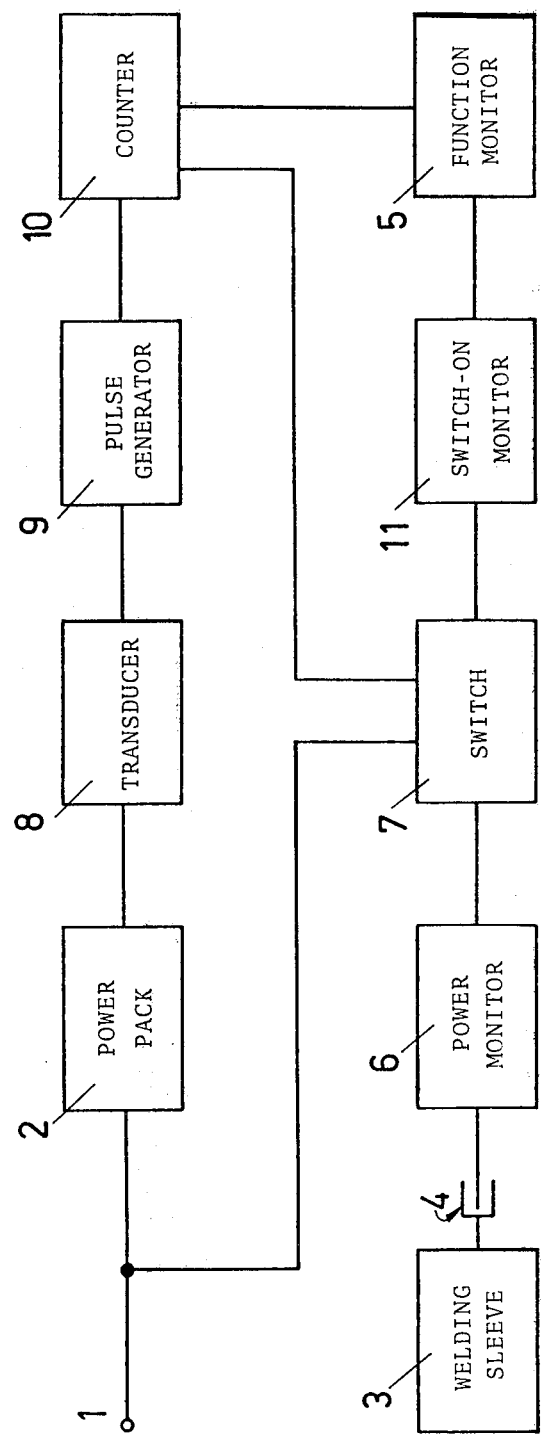

METHOD AND DEVICE FOR CONNECTING PIPE COMPONENTS MADE OF WELDABLE PLASTIC

The present invention relates to a method for connecting pipe components made of weldable plastic, by welding their ends by means of electrical resistance heating, and a device for performing the method.

When piping made of weldable plastic is being assembled considerable importance is attached to the method and the device used for interconnecting the piping components by electrical resistance heating. The expression "piping components" means pipe, adapting members of all types and fittings that are combined to form pipe systems and are to be interconnected. Connecting these piping components is a costly partial operation, and in addition determines the quality of the piping and for this reason has to be very reliably performed. Either sleeve joints, which constitute a part of the pipe components or welding sleeves that are separate from the pipe components and are installed on the ends of two components and connected to them, are used to connect the pipe components. A coil of resistance heating wire is placed in the overlapping areas of these connectors and this coil is heated electrically to make the connection, so that in the area around the coil the material of the overlapping ends of the piping components melts, thereby welding these components together. The thermal energy supplied through the coil is quantitatively regulated in such a manner that an optimum connection results, i.e., neither insufficient nor excessive heating is applied to the components that are to be connected. A device in which the adjustment of the thermal energy is made either manually or automatically is used for regulating the thermal energy according to the pipe components that are to be connected.

When welding the aforesaid connections by using such a device it is unavoidable, particularly in view of the fact that the connections are to be completed on a construction site, some of the connections will not be of sufficient quality. Usually this is because the amount of welding energy that is applied in making the connection is too small with regard to the type of connection and the prevailing environmental factors, e.g., the ambient temperature or a faulty connection, for example, loss of contact at a plug-in connector. In most instances this leads to the condition that although the connection is capable of withstanding mechanical loads it is not tight.

Thus, the problem of the present invention is to develop a method of the type described above, in such a manner that the largest number of influencing factors are at least approximately taken into consideration. According to the invention this problem is solved in that the square-law value of the welding voltage is formed and converted into a pulse frequency, the pulses being counted by a counter, the welding process being terminated once a nominal pulse count is reached. Thus, the welding energy supplied is very accurately maintained corresponding to the nominal welding energy, whilst also taking account of certain environmental influences, e.g. outside temperature, sleeve temperature, etc.

An additional safety feature with regard to the production of a welded joint is provided by a device which is suitable for performing the method according to the invention and which has an electrical circuit having a switch stage that can be switched off after metering the welding energy supply, whereby the switch stage incorporates means for its interruption if there is a failure of the power circuit.

An embodiment of the invention is illustrated in the accompanying drawing and is described hereinafter. The FIGURE-diagrammatically shows a device for connecting piping components made of weldable plastic in the form of a block diagram.

The device shown in the drawing is intended for making joints, particularly with welding sleeves but fundamentally there is no restriction regarding its use for welded joints of other types, e.g. sleeve joints. The device illustrated in the drawing is supplied with power by a power supply 1. The circuit is controlled by means of a switch stage 7. A welding sleeve 3 is connected to the output of the switch stage through a schematically represented plug 4. A power monitor 6 is located at the output of the switch stage 7. This device monitors the flow of current and maintains the switch stage, which incorporates, for example, a relay, in the operating position.

A power pack 2 is connected to the power circuit, and this power pack provides a low voltage supply, e.g., 12 Volts, that powers the device. The output voltage of the power pack 2 is measured in a transducer 8 and converted into a square-law product of the supply voltage $U^2$. The output of the transducer 8 is connected to the input of a pulse generator 9, which generates a pulse frequency that corresponds to the square of the voltage. This squared value variable frequency signal, the repetition rate of which is proportional to the squared value, is formed from the charging curve of a capacitor which is supplied directly or indirectly through a resistor from the voltage that is applied to the welding sleeve. If this capacitor is connected to a DC source the capacitor voltage can only increase to the level of the supply voltage. Its time constant T, i.e., the time in which 63% of the maximum possible capacitor voltage is reached, is determined from the equation $T = C \cdot R$, wherein C is the capacitance of the capacitor and R is its ohmic resistance. As is known, the capacitor voltage does not increase linearly, but according to the equation $$U_c = U(1 - e^{-t/T})$$

wherein $U_c$ is the capacitor voltage, U the charging voltage and t the charging time. If, when a specific charging voltage is reached, the capacitor is discharged by means of a switch stage which incorporates, for example, a comparator, a new charging cycle will begin and will result in a frequency that is controlled by the charging voltage or the supply voltage.

The simulation of the square-law function of the supply voltage in the range, for example, 180–260 V can be achieved by the fact that the switch point of the discharge, e.g. is fixed at a value of 0.39 of the supply voltage at 220 V. If the voltage deviates from this value, there will be an overcompensation of the square-law supply voltage. At low supply voltages, this overcompensation is necessary to counteract the considerable heat transfer occurring in the plastic material as a result of the lengthy welding time. Thus, the welding time is not only increased corresponding to the low supply voltage, but additionally as well. It is therefore possible to achieve a constant weld quality, even if, for example, at 180 V the welding time increases by a factor of 1.5. In a similar manner, suitable selection of the partial value of the charging or mains voltage provides for overcompensation at voltages that are in excess of the selected charging or mains voltage value.

A counter 10 is provided at the output of the pulse generator, and the pulses are summed in this counter. The capacity of this counter 10 is, for example, $2^8$–$2^{24}$ pulses. In accordance with the dependency of the pulse frequency of the pulse generator 9 on the square-law value of the voltage, a total number of pulses summed in the counter 10 will indicate a specific thermal energy.

It is important that during welding of the welding sleeve 3 the number of pulses in the counter 10 corresponding to the welding energy is reached. This is ensured by means of a function monitor 5. If the pulse counter 10 has not yet reached its preselected pulse count, e.g., as a result of a break in the circuit between the device and the welding sleeve during welding, the function monitor 5 gives a warning signal, e.g. a red warning light flashes. As soon as the warning signal starts, this indicates that the welding of the sleeve 3 must be checked. At the same time as the warning signal the mains voltage to the welding sleeve 3 is cut off by the switch stage 7. Connecting in the circuit by switching on the switch stage 7 is controlled by a switch-on monitor 11. The monitor 11 uses an extra-low potential to determine whether a welding sleeve 3 or an equivalent resistance is connected to the circuit output 4. Advantageously power monitoring is performed in such a way that the circuit can only be switched on when the load resistance is below a certain value, e.g. 3 kOhm.

The device ensures maximum operating safety. The output for the circuit of the device remains blocked until a load resistor having a resistance lower than a threshold resistance is connected. Only then does switch-on monitor 11 stop its blocking action and the switch stage 7 can be switched on by means of a push-button, which is not illustrated.

In addition, environmental factors will also be eliminated, at least in part. Since thermal energy, due to the voltage is determined according to the formula $U^2 \cdot t/R$, at low ambient temperatures the welding performance is better, always assuming that the electrical resistance heating wire is a cold conductor. In like manner a shape factor which takes account of the shape of the welding sleeve can also be taken into consideration with regard to the dependence of the voltage or its square-law value on the pulse frequency. Due to the high counter capacity it is possible to adhere very closely to the welding time, which can be of the order of 70–80 seconds, whilst still sufficiently reliably determining times of at least 20 minutes.

It is important that due to the design of the device, its construction is very simple and at the same time, it is possible to achieve a weight saving of up to 80% compared with known welding devices.

I claim:

1. A method for welding adjacent ends of piping comonents of weldable plastic by electrical resistance heating, comprising the steps of supplying a welding voltage to resistance heating wire of a welding sleeve;
forming a multiple product of said welding voltage;
converting said multiple product into a corresponding pulse frequency;
counting pulses of said pulse frequency; and
terminating said welding voltage to said heating wire once a predetermined pulse count is reached.

2. A method according to claim 1, wherein a warning signal is activated if said predetermined pulse count is not reached prior to interruption of suppling welding voltage to said heating wire.

3. A method according to claim 2, wherein said pulse frequency is formed by charging a capacitor through a resistor and discharging said capacitor through a switch stage upon reaching a charging voltage corresponding to a predetermined partial value of said welding voltage.

4. A method according to claim 1, wherein said pulse frequency is formed by charging a capacitor through a resistor and discharging said capacitor through a switch stage upon reaching a charging voltage corresponding to a predetermined partial value of said welding voltage.

5. A method according to claim 1, wherein said multiple product is a square law product of said welding voltage.

6. A device for controlling welding cycles for welding adjacent ends of piping components of weldable plastic by electrical resistance heating, comprising means for coupling a resistance heating wire of a welding sleeve to a power supply through a switching means;
multiplier means for forming a multiple product of voltage from the power supply;
converter means for converting said multiple product into a corresponding pulse frequency;
means for counting pulses of the pulse frequency; and
means for opening said switch means to terminate voltage to the heating wire when a predetermined pulse count is reached.

7. A device according to claim 6, further comprises means for monitoring supplying of voltage to the heating wire to sense interruptions therein.

8. A device according to claim 6, further comprises means for activating a warning signal if the predetermined pulse count is not reached prior to interruption of voltage to the heating wire.

9. A device accordingly to claim 6, wherein said multiplier means forms a square law product of the voltage.

10. A device according to claim 6, wherein said converter means comprises a capacitor charged through a resistor and means for discharging said capacitor through a switch stage upon reaching a charging voltage corresponding to a predetermined partial value of the voltage from the power supply.

11. A device according to claim 6, further comprises a welding sleeve of thermplastic material having a electrical resistance heating wire embedded therein.

* * * * *